United States Patent Office 2,887,223
Patented May 19, 1959

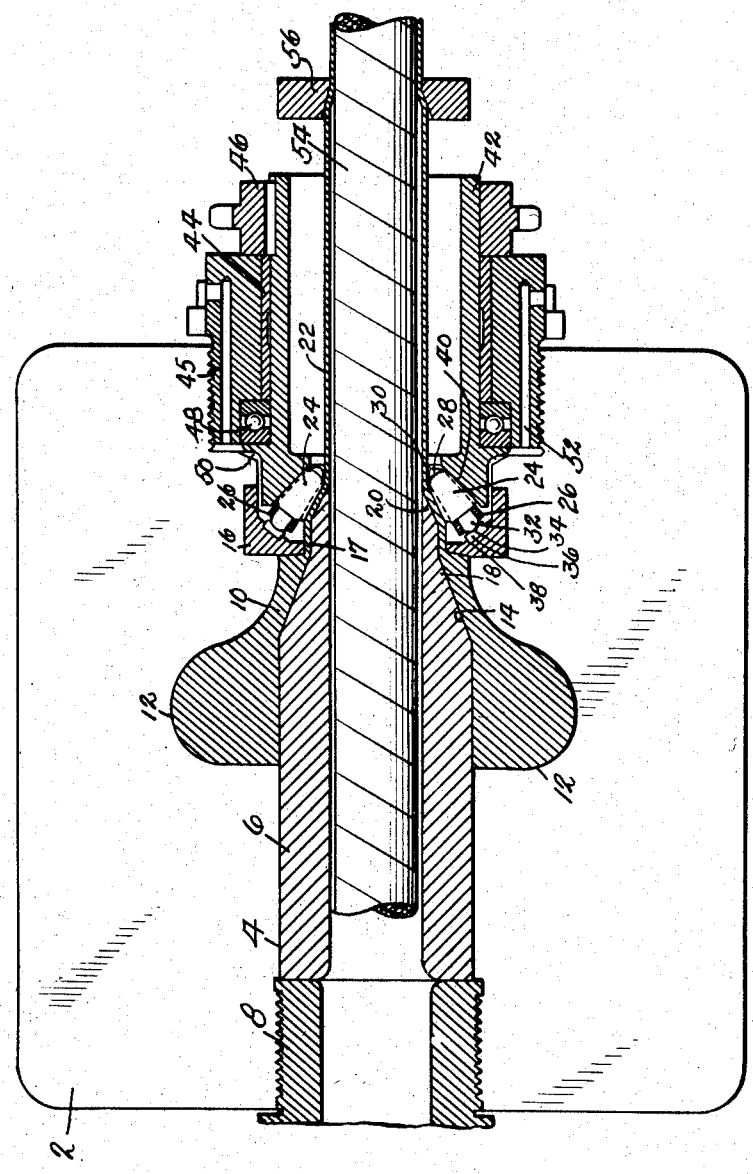

2,887,223

EXTRUSION APPARATUS FOR SHEATHING ELECTRIC CABLES

Aubrey Latin, Bayswater, London, George Thomas Wilson Grieve, Woolwich, London, and James Conning, Bexley, England, assignors to The Okonite Company, Passaic, N.J., a corporation of New Jersey Original application May 23, 1952, Serial No. 289,618, now Patent No. 2,751,077, dated June 19, 1956. Divided and this application March 23, 1956, Serial No. 573,468

1 Claim. (Cl. 207—4)

This invention relates to the sheathing of electric cables by extrusion, that is, by a process wherein a mass of metal in a plastic state is converted into an elongated body of the required cross-sectional shape by forcing the plastic metal through an appropriately shaped orifice.

In the production of sheaths by conventional equipment it has been found difficult to maintain the wall thickness of the sheath constant within very close limits at all points around the sheath circumference and at all points along its length. Accordingly, the practice has been to produce a sheath whose average wall thickness is considerably above that of the minimum permissible wall thickness, but, while safe, this practice is extravagant of material.

Our invention enables a cable sheath to be produced by extrusion, the wall thickness of the sheath being constant within fine limits, thereby enabling economies in material to be effected.

By the present invention we provide for extruding a metal cable sheath in the form of a metal tube and then operating upon the internal and external surfaces simultaneously of each elemental length of the advancing tube, to displace metal, in a direction having a substantial circumferential component, from elemental areas of wall the thickness of which may be materially greater than the desired thickness to elemental areas of wall of a thickness materially less than the desired thickness.

In this way inequalities in the wall thickness of the elemental length are substantially reduced, and the wall of the sheath is caused to assume a thickness which is, within close limits, constant throughout its circumference.

The circumferential displacement of metal above referred to usually will be followed by a reducing process, to reduce the sheath to the size required for the finished sheath.

In general, our improved apparatus comprising metal extrusion equipment having a circular inner die and a circular outer die cooperating to form an annular extrusion orifice for the formation of an extruded body of predetermined wall thickness. The inner die projects beyond the outer die, to provide an internal gauging member. Cooperating with this internal gauging member is an external gauging member comprising several rollers which are rotatably mounted in a carrier which is rotatable about the axis of the extrusion orifice. As the carrier is rotated, the rollers will displace metal from elemental areas of wall of which the thickness is materially greater than desired to elemental areas of wall of a thickness materially less than the desired thickness.

In the accompanying drawing we have shown an embodiment of our invention in sectional plan.

Referring to the drawing in detail:

2 designates a die box, which may be composed of an upper and a lower part, making joint in a horizontal plane. The contiguous faces are recessed, these recesses cooperating, as will be understood, to form a through-bore 4.

In the through-bore we position a tubular mandrel or point holder 6, held in place by a tubular nut or externally threaded tubular plug 8 at its rear end.

At the front end of the mandrel 6, viz., the right-hand end as viewed in the drawing, the bore 4 is enlarged to form between the mandrel and the wall of the bore an annular forming chamber 10, into which a pair of passages 12 lead from a suitable opening (not shown) in the upper face of the die box. The front or right-hand end of the mandrel 6 is conical externally, as shown at 14, and cooperates with an outer die or matrix 16 to form an annular extrusion orifice 17 at the front end of the forming chamber.

As will be seen from the drawing, the right-hand or front end of the mandrel 6, which constitutes the inner die member, projects beyond the outer die or matrix 16 and terminates in a cone 20, the external surface of this cone providing an internal gauging member.

The outer or external gauging device, cooperating with the conical portion 20 of the mandrel 6, comprises a plurality of rollers 24, which are of frusto-conical form and set in a cage 26 at such an angle that the roll surface converges slightly with respect to the external surface of conical portion 20 of the mandrel 6.

The small end 28 of each roller 24 is spherical and is seated in a spherical bearing 30, formed in the adjoining part of the cage 26. The other end of each roller 24 carries a cylindrical stub 32, which projects beyond the cage 26 and terminates in a spherical surface 34, which seats in a thrust pad 36, which is supported by a conical face 38 on the outer die or matrix 16.

The rollers are driven in rotation about the inner gauge by engagement with a conical face 40 on the inner end of a driving sleeve 42, which is supported in a bearing 44, housed in a threaded plug 45, screwed into the enlarged end of the bore 4 of the die box. The sleeve 42 is driven by means of a gear wheel 46 on the projecting end of the driving sleeve. End thrust between the driving sleeve and its bearing is taken up by a ball thrust 48.

The rollers and their bearings are lubricated with liquid lubricant, fed through passages 50 and 52, which escapes through the large annular clearance between the extruded sheath 22 and the driving sleeve 42.

Endwise adjustment of the rollers 24 may be obtained by using sets of thrust pads 36 of different thicknesses.

Where the sheath is to be reduced in diameter so as more tightly to grip the cable core 54, the sheath and cable core may be pulled through a sinking die 56 as they emerge from the driving sleeve 42. In this operation the cable core provides sufficient support for the drawn down sheath to allow a pull to be applied to the sheath by means of a haul-off capstan or the like, sufficient to advance the sheath successively through the gauging and reducing devices.

This application is a division of our co-pending application Serial No. 289,618, filed May 23, 1952, now Patent No. 2,751,077, dated June 19, 1956.

What we claim is:

Apparatus for sheathing electric cables, said apparatus comprising, in combination, a metal extrusion die box provided with an axial bore; a tubular mandrel mounted within said bore; an outer die member encircling the said mandrel adjacent the forward end of the same, said outer die member being spaced from the mandrel, whereby an extrusion orifice is provided, concentric with the axial bore of said die box, for extruding a sheath about a cable core passing through said bore, the forward end of said mandrel projecting beyond said outer die member in the form of a hollow cone; a rotatable driving sleeve; a bearing therefor; a plug threaded into the front end of said die box for holding said sleeve and its bearing in place in concentric relation with the said mandrel; and a plurality of rollers mounted at the inner end of said driving sleeve between the end of said sleeve and said external die member and disposed concentrically about and in spaced relation to the conical end of said mandrel, said rollers being frictionally engaged by the inner end of said driving sleeve to be driven in rotation about the conical end of said mandrel in engagement with the sheath being extruded as it advances between the rollers and the conical end of said mandrel.

References Cited in the file of this patent

UNITED STATES PATENTS

| | | |
|---|---|---|
| 327,835 | Tatham | Oct. 6, 1885 |
| 2,142,526 | Norris | Jan. 3, 1939 |
| 2,233,106 | McGuire | Feb. 25, 1941 |
| 2,234,340 | Gillis | Mar. 11, 1941 |
| 2,262,716 | Wolfer | Nov. 11, 1941 |
| 2,359,453 | Waldron | Oct. 3, 1944 |

FOREIGN PATENTS

| | | |
|---|---|---|
| 12,139 | Great Britain | Mar. 4, 1915 |
| 415,359 | Great Britain | Aug. 23, 1934 |
| 544,386 | Great Britain | Apr. 10, 1942 |
| 681,217 | France | Jan. 28, 1930 |